Patented Feb. 9, 1926.

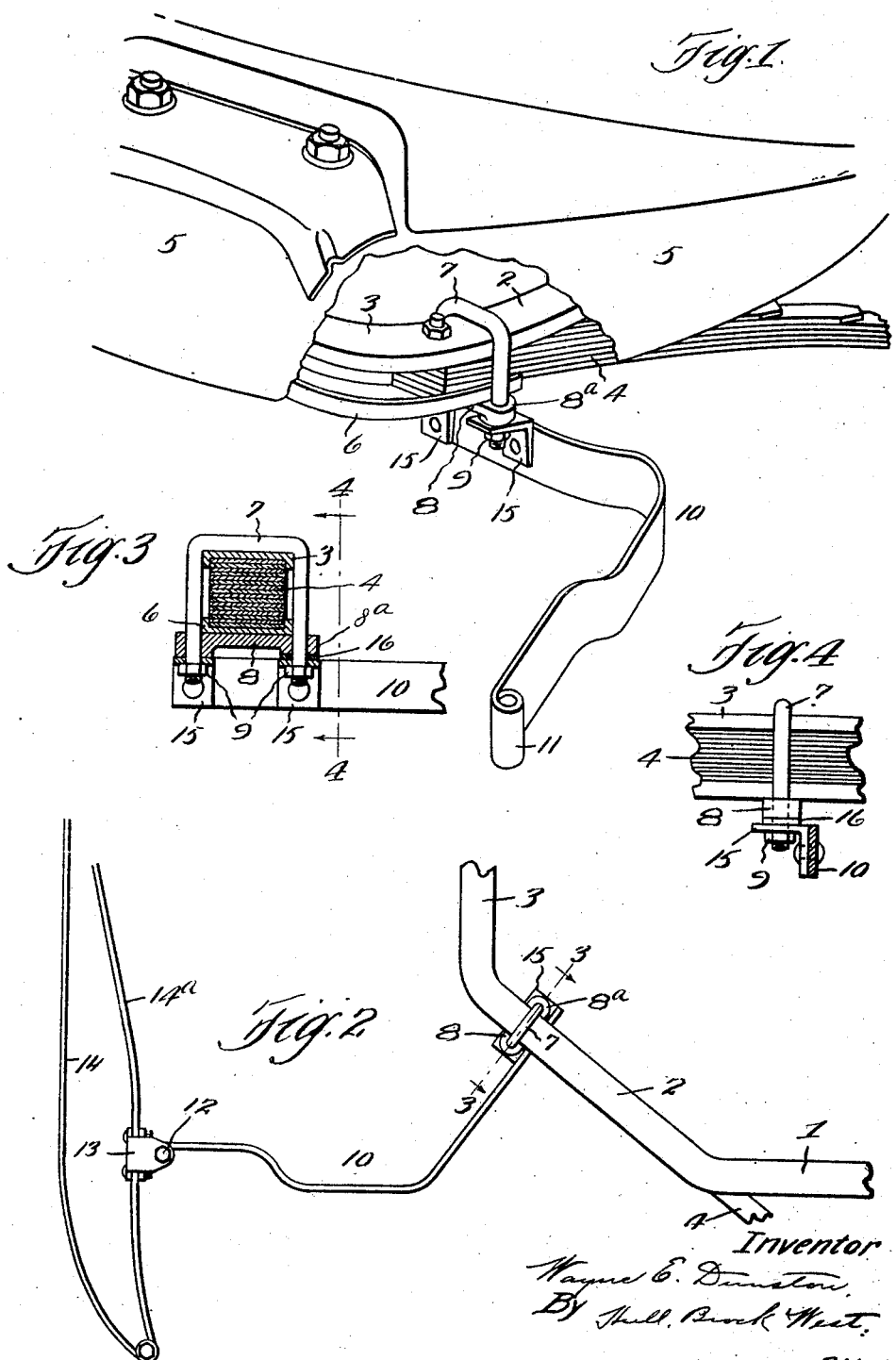

1,572,594

UNITED STATES PATENT OFFICE.

WAYNE E. DUNSTON, OF DETROIT, MICHIGAN, ASSIGNOR TO THE C. G. SPRING & BUMPER COMPANY, OF DETROIT, MICHIGAN, A CORPORATION OF DELAWARE.

BUMPER ATTACHING AND SUPPORTING MEANS.

Application filed May 8, 1923. Serial No. 637,458.

*To all whom it may concern:*

Be it known that I, WAYNE E. DUNSTON, a citizen of the United States, residing at Detroit, in the county of Wayne and State of Michigan, have invented a certain new and useful Improvement in Bumper Attaching and Supporting Means, of which the following is a full, clear, and exact description, reference being had to the accompanying drawings.

This invention relates to means for supporting bumpers from the frame members of automobiles, and more particularly to the means for supporting bumpers from the rear ends of especially-constructed frames, such as are used with certain makes or types of automobiles. It is the general object of the invention to provide a construction of bumper-supporting arms and of cooperating attaching means which will enable the said arms to be conveniently applied and secured to the said members and to enable them, when so applied and secured, to support the bumpers in an effective manner. I accomplish the foregoing objects by the construction illustrated in the drawings forming part hereof, wherein Fig. 1 represents a perspective view, with parts broken away, of the rear portion of an automobile having my invention applied thereto; Fig. 2 a detail in plan of the frame, the bumper supporting arm, and a portion of the bumper connected to such arm; Fig. 3 a sectional detail corresponding to the line 3—3 of Fig. 2; and Fig. 4 a sectional elevation corresponding to the line 4—4 of Fig. 3.

Describing the parts by reference characters, 1 indicates one of the side frames of the automobile, the said side frame having an inwardly and rearwardly projecting extension 2 and a central transverse extension 3. The opposed parts 2 and the intermediate part 3 constitute supports for the rear and inner ends of springs, one of which is indicated at 4, the front and outer end of each spring being connected to the rear axle (not shown) as is usual with a well-known type of automobile now on the market. In practice, the rear ends of the frame members 1 and the parts 2 and 3 are covered by a downwardly extending apron, indicated generally at 5. The frame member 2 is in the shape of a channel having its web horizontal and its flanges projecting downwardly, and the rear and inner end of each spring 4 is received within such channel, the end of the two springs each being received between this upper channel and a lower channel 6, the springs being clamped each by means of a clip bolt 7, a tie bar 8 and nuts 9.

For the purpose of supporting the bumper from a construction such as disclosed herein, I provide a pair of arms, one of which is indicated generally at 10. Each arm is provided at its rear end with an eye 11 adapted to receive a bolt 12 which in turn supports a clamp 13 attached to the bumper, indicated generally at 14, 14ª. Each bumper arm is so bent or shaped that, when connected to its cooperating extension 2 of the side frame, it will extend at right angles from such support. The outer part of each bumper arm also extends at substantially right angles from the part of the bumper bar to which it is connected, the intermediate part of the arm being offset. This construction enables the bumper arms to cooperate most efficiently with the bumper in resiliently absorbing blows received by the latter and at the same time transmits these blows in the most efficient manner from the bumpers to the arms and from the arms to the frame.

For the purpose of making the connection between each arm and the cooperating frame member, I provide such arm with a pair of angular lugs 15, riveted or otherwise suitably secured thereto, the lugs being so spaced as to receive the lower ends of the clip bolts 7. Of course, should the clip bolt usually provided for the springs be too short to permit of its use, it may be replaced by a longer clip bolt of similar shape. If necessary, each arm 10 may be leveled by inserting one or more washers 16 between the appropriate lug or lugs and the bosses 8ª on the tie bar.

By the construction shown and described herein, a bumper may be quickly and conveniently applied to an automobile having a frame construction of the character shown herein and, when so applied, the bumper will be supported in an efficient manner, and the bumper and its supports and connections will be capable of withstanding all of the ordinary incidents of use.

Having thus described my invention, what I claim is:

1. The combination, with the inwardly inclined side portions of a vehicle frame, of a bumper, and arms connecting said bumper to such inclined portions of the side frame, the ends of said arms extending at substantially right angles from the bumper and at substantially right angles from such inclined side portions of the vehicle frame.

2. The combination, with the inwardly inclined side portions of a vehicle frame, of a bumper, attaching arms for securing the bumper to such inclined side portions of the frame, means pivotally connecting the outer ends of said arms to said bumper, and means securing the inner ends of said arms to the said side portions of the vehicle frame, respectively, the inner end portions of the said arms extending at substantially right angles to such inclined side portions.

3. The combination, with the inwardly inclined side portions of a vehicle frame, of a bumper, attaching arms for securing the bumper to such inclined side portions of the frame, means connecting the outer ends of said arms to said bumper, and means securing the inner ends of said arms to the said side portions of the vehicle frame, respectively, the inner end portions of the said arms extending at substantially right angles to such inclined side portions and the intermediate portions of said arms being offset.

4. The combination, with the inwardly inclined side portions of a vehicle frame, of a bumper, arms for supporting the said bumper from such inclined side portions, means connecting the outer ends of said arms to said bumper, and means connecting the inner ends of said arms to the inclined side portions of the vehicle frame, respectively, the intermediate portions of said arms being offset.

5. The combination, with the inwardly inclined side portions of a vehicle frame, of a bumper, arms for supporting the said bumper from such inclined side portions, means connecting the outer ends of said arms to said bumper, and means connecting the inner ends of said arms to the inclined side portions of the vehicle frame, respectively, the intermediate portions of said arms being offset and the inner ends of the arms extending at substantially right angles from their respective vehicle frame portions and the outer ends of said arms extending at substantially right angles from the bumper.

In testimony whereof, I hereunto affix my signature.

WAYNE E. DUNSTON.